US007667123B2

(12) United States Patent
Phillips et al.

(10) Patent No.: US 7,667,123 B2
(45) Date of Patent: Feb. 23, 2010

(54) SYSTEM AND METHOD FOR MUSICAL PLAYLIST SELECTION IN A PORTABLE AUDIO DEVICE

(76) Inventors: Mark E. Phillips, 3028 22nd Ave. West, Seattle, WA (US) 98119; Eric P. Gibbs, 2918 NW. Esplanade St., Seattle, WA (US) 98117

( * ) Notice: Subject to any disclaimer, the term of this patent is extended or adjusted under 35 U.S.C. 154(b) by 1957 days.

(21) Appl. No.: 09/975,748

(22) Filed: Oct. 10, 2001

(65) Prior Publication Data
US 2002/0045960 A1 Apr. 18, 2002

Related U.S. Application Data

(60) Provisional application No. 60/240,766, filed on Oct. 13, 2000.

(51) Int. Cl.
*G10H 1/00* (2006.01)
*G10H 1/18* (2006.01)
(52) U.S. Cl. .............................. 84/615; 84/600; 84/601; 84/653
(58) Field of Classification Search ........... 84/600–603, 84/609–610, 615, 634, 649–650, 653, 666, 84/477 R
See application file for complete search history.

(56) References Cited
U.S. PATENT DOCUMENTS
5,739,451 A * 4/1998 Winksy et al. ................ 84/609

6,377,530 B1 * 4/2002 Burrows ....................... 84/609

* cited by examiner

*Primary Examiner*—Marlon T Fletcher

(57) ABSTRACT

A portable audio playing device implements a jukebox manager function to permit the simple generation of musical playlists and the alteration or editing of existing playlists. Data, such as MPEG-3 data or other conventional audio format data, may be readily downloaded into the system for storage in a solid state memory or in a spinning media device. The audio tracks are associated with one or more metatags that are used to describe the content of each track. The metatags and associated audio tracks are stored in a data structure that may be implemented as a database or other convenient data structure that readily permits searching by user-specified search terms. The user generates a new playlist by selecting one or more metatags corresponding to the desired musical tracks. The system queries the data structure using the user-specified metatags and automatically generates a playlist containing one or more audio tracks whose metatags correspond to the user-specified metatags. Alternatively, the system may perform the same query and simply generate a results list that will allow the user to manually specify which of the audio tracks identified by the search process will be added to the newly created playlist. The system also permits the simple editing of existing playlists. New audio tracks may be added in the manner described above using metatags for searching or maybe manually added from the list of stored audio tracks. The system readily supports different audio formats and different playlist types.

1 Claim, 8 Drawing Sheets

SYSTEM AND METHOD FOR MUSICAL PLAYLIST SELECTION IN A PORTABLE AUDIO DEVICE

CROSS-REFERENCE TO RELATED APPLICATION

This application claims the benefit of U.S. Provisional Patent Application No. 60/240,766 filed Oct. 13, 2000, where this provisional application is incorporated herein by reference in its entirety.

TECHNICAL FIELD

The present invention is related generally to portable audio devices and, more particularly, to a system and method for cataloging and creating playlists of audio data files.

BACKGROUND OF THE INVENTION

Portable audio devices have evolved from large cumbersome analog tape players to highly miniaturized digital storage devices. Early portable audio devices were typically in the form of analog tape players that sequentially played musical selections (or other audio presentations). For example, a prerecorded audio tape could be purchased by the user and sequentially played in a portable tape player. However, the user had no control over the sequence of play other than to stop the playing and manually fast forward or rewind to skip over one or more selections.

With the advent of portable digital devices in the form of compact disk (CD) players, the user has additional flexibility in the selections of songs from a CD. For example, some CD players permit the user to manually enter the sequence of musical tracks that will be played rather than play the musical tracks in a predetermined sequence from start to finish. Alternatively, some CD players also include a "random" mode in which musical tracks are randomly selected. However, the CD players described above are still limited to the selection of musical tracks on a single CD. Digital musical devices have been designed to eliminate all moving parts. These devices incorporate solid state memory storage technology and utilize digital processing capabilities, such as data compression, to minimize data storage requirements. A popular musical format, known as Motion Pictures Expert Group layer 3 (MPEG-2 layer 3) defines a digital musical format that plays "near-CD quality" music from a relatively small digital file as compared with the original digital file stored on a CD. Using known data compression techniques, the data structure defined by MPEG-2 layer 3, sometimes abbreviated as MP3, is approximately one tenth the size of a comparable data file on a CD.

With the introduction of large storage capacity MP3 players, the user may record and store a large number of musical data files. However, track selection and organization of such data files cannot be readily accomplished with conventional techniques. Therefore, it can be appreciated that there is a significant need for a system and method that will allow easy organization of data files in a portable digital audio device. The present invention provides this, and other advantages, as will be apparent from the following detailed description and accompanying figures.

DETAILED DESCRIPTION OF THE INVENTION

The present invention is directed to techniques that permit the user to implement a form of "jukebox" on a portable audio device. A jukebox manager allows the user to create, edit, and utilize a playlist comprising one or more data files. In a typical implementation, each data file is a separate musical track. The jukebox manager provides the user with a quick, flexible tool to organize music into playlists. As will be discussed in greater detail below, the system supports different play file formats and allows the user to generate or edit a playlist regardless of the format of the data file.

Figure 1:
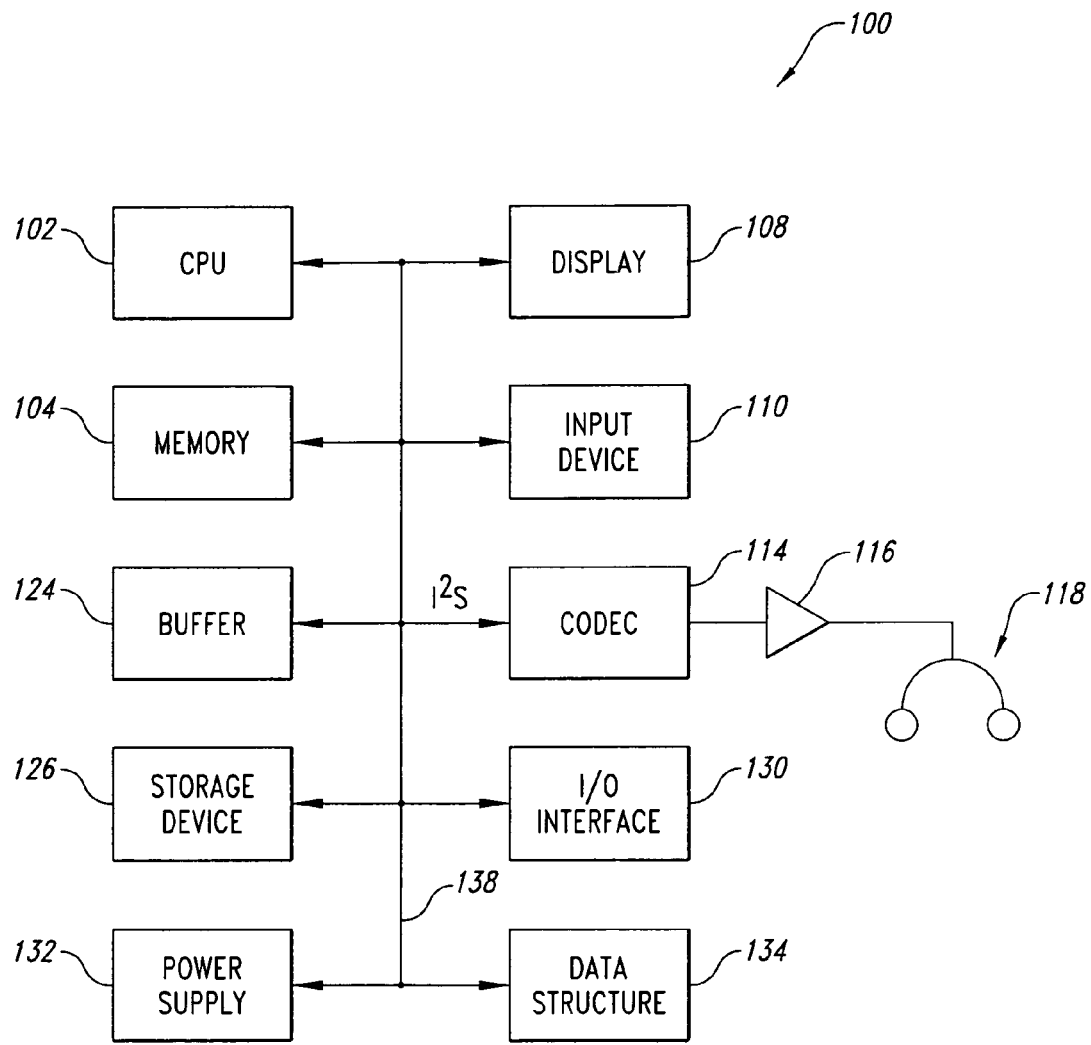
FIG. 1 is a functional block diagram of an exemplary embodiment of the present invention.

The present invention is embodied in a system 100, illustrated in the functional block diagram of FIG. 1. The system 100 includes a central processing unit (CPU) 102 and a memory 104. The CPU 102 may be implemented using a device, such as the ARM 7209 from Cirrus Logic or other processor designed for operation as an MP3 player. However, those skilled in the art will appreciate that the CPU 102 may be implemented using any convenient processor, such as a microprocessor, embedded controller, digital signal processor (DSP) or the like. The present invention is not limited by the specific form of the CPU 102. The memory 104 may typically include both random access memory (RAM) and readonly memory (ROM). In one embodiment, the ROM portion of the memory 104 may be implemented using a flash program memory or a NAND flash memory. In addition, the memory 104 includes a basic input output system (BIOS), which contains instructions that allow the CPU 102 to communicate with various peripheral devices.

In addition, the system 100 includes a display 108. In an exemplary embodiment, the display 108 is implemented as a liquid crystal display (LCD) to reduce overall power consumption. In one example, the display 108 may be a 240 by 160 pixel LCD subsystem, such as may be commercially purchased from a number of vendors. The display 108 may conveniently provide instructions to the user as well as programmable functions that may be context-sensitive. For example, when playing a music signal, the display 108 may provide commands associated with music playing, song information, and the like. For example, the display 108 may show the data sampling rate and number of kilobytes (Kb) in a particular data file. The display 108 may also include other information, such as power status, startup information, and the like.

The system 100 also includes an input device 110. The input device 110 may be implemented as a series of electromechanical switches using conventional techniques. Alternatively, the input device 110 may be implemented in conjunction with the display 108 to provide a touch-sensitive display. A touch-sensitive display advantageously minimizes the need for electromechanical switches and further provides labels on the display that may be readily altered to accommodate variations in the implementation of the system 100. Alternatively, the input device 110 may comprise both electromechanical switches and a touch-sensitive display. Electromechanical switches and touch-sensitive displays are known in the art and need not be described in further detail herein. However, the present invention is not limited by the specific form of the input device 110.

As those skilled in the art can appreciate, the data representing the audio signal is in the form of digital samples. The digital data must be converted to analog form to produce a useful signal for the user. The system 100 includes a coder/decoder (CODEC) 114. The CODEC 114 is also sometimes referred to as a "compressor/decompressor" because the digital data samples are usually stored in a compressed form and are decompressed for playback. The CODEC 114 accepts a digital data stream and converts it to a representative analog signal. Different commercial CODECs are available for audio applications. Some CODECs, such as a code excited linear prediction (CELP) CODEC is designed for operations at relatively low frequencies and thus is particularly useful as a speech CODEC. Other forms of speech CODECs include adaptive delta modulation (ADM), pulse code modulation (PCM) and adaptive differential pulse code modulation (AD-PCM).

Other forms of CODECs are designed for operation at higher data sampling rates and are thus useful for music applications. These music CODECs include MPEG or MP3 CODECs, G2 format, developed by Real Networks, Enhanced Perception Audio Decoder (ePAC), developed by Lucent, AC3 algorithm, which is a modified version of PCM, and Windows Media Audio (WMA), developed by the Microsoft Corporation. Some formats, such as the G2 format, may be used for both music and voice. Although the examples illustrated herein are directed to MP3 music format, those skilled in the art will recognize that the CODEC 114 illustrated in FIG. 1 may be satisfactorily implemented using any of the known CODEC technologies for either speech applications, music applications, or both. Thus, the present invention is not limited by the specific implementation of the CODEC 114.

In a typical embodiment, the system 100 may include multiple CODECs to process different file types. For example, an MP3 CODEC may be included to process music files encoded in accordance with an MP3 format. Other data files, such as audio books, may be processed using a different CODEC, such as the CELP CODEC. The playlists generated by the present invention may include data files of different types, such as an MP3 data file. The data file types may typically be identified by the file extension. For example, an MP3 file is followed by an extension ".m3u" while other data files may have a different file extension, such as ".1st." For the sake of convenience in operation, the system 100 of the present invention may display the names of data files without file extensions since multiple CODECs are available to process different file types. From the perspective of the end user, the file type and format is irrelevant so long as the user knows that the system can process the data file(s) selected by the user. Therefore, the playlist need not contain any file extensions. Alternatively, the system can display file extensions simply to provide the user with additional information concerning the various file types.

In an MP3 environment, the digital data is provided to the CODEC 114 using an I²S bus. The I²S bus is a high speed serial bus that is well known to those of ordinary skill in the art. As such, implementation details of the I²S bus need not be provided herein. The CODEC 114 receives the data on the I²S bus and converts it from digital data form to analog data. An analog amplifier 116 has an input terminal coupled to the output of the CODEC and receives the analog signal thereon. The amplifier 116 provides the necessary amplification and drive capability to power an audio output device 118, such as a pair of headphones. It should be noted that in a typical implementation, the output of the amplifier 116 is coupled to a standard ⅛ inch phone jack (not shown). The headphones 118 plug into the phone jack.

The system 100 also includes a buffer 124 that receives and temporarily stores digital data and provides the digital data to the CODEC 114. As will be discussed below, the buffer 124 receives data from a storage device 126. The buffer 124 may be a stand-alone device, or may be a portion of the memory 104. The use of the buffer 124 in optimizing the response of the storage device 126 will be discussed below.

The storage device 126 is typically implemented as a spinning media device, such as a micro-drive, click drive, or the like. The storage device 126 has a controllable motor (not shown) that is only enabled when the system 100 requires a data transfer to or from the storage media. The optimization of the storage device 126 includes a determination of when to start the motor on the storage device to allow it to come up to full speed, and how long to maintain power to the motor so as to transfer the desired amount of data from the storage media to the buffer 124.

Those skilled in the art will recognize that the storage device 126 is an optional component and may be eliminated without adversely affecting the operation of the present invention. A number of portable audio devices contain no storage device 126, but rely solely on the memory 104 to store the musical tracks. For the sake of completeness, the buffer 124 and storage device 126 are described herein. The buffer 124 is implemented in the system to optimize data transfer from the storage device 126. Although it is beyond the scope of the present invention, the buffer 124 may be allocated into a large number of buffer portions with one of the buffer portions being actively used to transfer data to the CODEC 114 while the remaining buffer portions are available for data transfer from the storage device 126. If the system 100 is implemented without the storage device 126, the buffer 124 may also be eliminated without adversely affecting the operation of the system. In this implementation, the musical track data is transferred directly from the memory 104 to the CODEC 114. Because the memory 114 is a solid state memory, data transfer rates are sufficiently high to accommodate satisfactory data transfer to the CODEC so as not to cause interruptions in the generation of output data.

The system 100 also may include an optional input/output (I/O) interface 130. The system 100 may include any conventional form of I/O interface and may typically include a serial interface and/or a universal serial bus (USB) interface. The operation of a serial interface and USB interface are well-known in the art and need not be described in greater detail herein. Although illustrated as a single I/O interface 130, those skilled in the art will recognize that the I/O interface 130 is intended to illustrate the function of one or more conventional interfaces.

A power supply 132 provides power to all of the components of the system 100. In an exemplary embodiment, the power supply 132 comprises two or more AAA batteries. A voltage regulator (not shown) in the power supply 132 provides a regulated voltage of approximately 3.1 VDC. The power supply 132 may also include provisions, such as an external power supply jack 170 (see FIG. 2), to permit the introduction of power from an external source, such as a cigarette lighter in an automobile, or the like.

The system also includes a data structure 134 to store data related to user-generated playlists and associated data. In one embodiment, the data structure 134 may be implemented as a database. However, those skilled in the art will recognize that any convenient form of known data structure will operate satisfactorily with system 100. Furthermore, the data structure 134 may be a portion of the memory 104 or a stand-alone data storage element. The present invention is not limited by the specific form in which the data structure 134 is implemented.

The various components of the system 100 are coupled together by a bus system 138. The bus system 138 may include a data bus, control bus, the $I^2S$ bus, a memory bus, and the like. However, for the sake of simplicity, these various buses are illustrated in FIG. 1 as the bus system 138.

Figure 2:
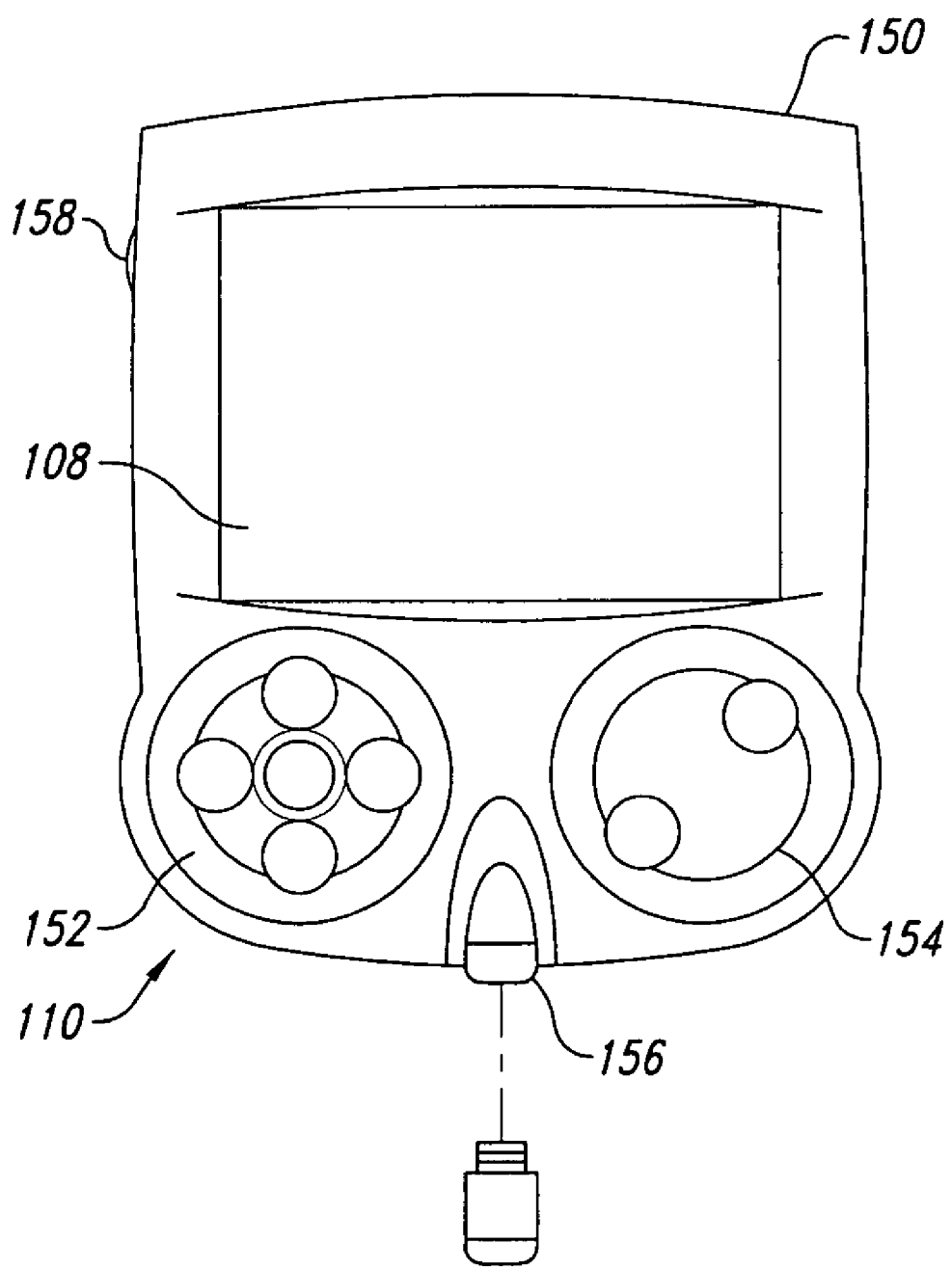
FIG. 2 is a top plan view of one embodiment of the present invention.

The system 100 is intended for portable operation. The various components described above are typically implemented as one or more integrated circuits on a printed circuit (PC) board (not shown). The PC board power supply 132, display 108, input device 110, and other components of the system 100 are enclosed in a case or housing 150, as illustrated in FIG. 2. As further illustrated in FIG. 2, the input device 110 comprises a four-button key pad assembly 152, a two-button key pad assembly 154, and an optional joystick 156. The four-button key pad 152 may be conveniently configured to function in a manner similar to well-known handheld electronic games. Alternatively, the four-button key pad 152 can be replaced with a membrane (not shown) to permit the operation of four hardware buttons in a manner similar to a top hat switch on a joystick wherein one or two of the buttons may be activated to provide eight unique switch settings. In yet another alternative, the four-button key pad 152 or the two-button key pad 154 could be replaced with a position-sensing membrane, such as a touch pad commonly used in laptop computers. Those skilled in the art will recognize that other configurations may also be used for the input device 110. As will be described in greater detail below, the display 108 may conveniently comprise touch-sensitive display technology that will allow readily alterable configurations for control buttons that will correspond with the particular data shown on the display 108. A power switch 158 may be conveniently installed in the side of the housing 150 to allow the user to turn the system on and off.

Figure 3:
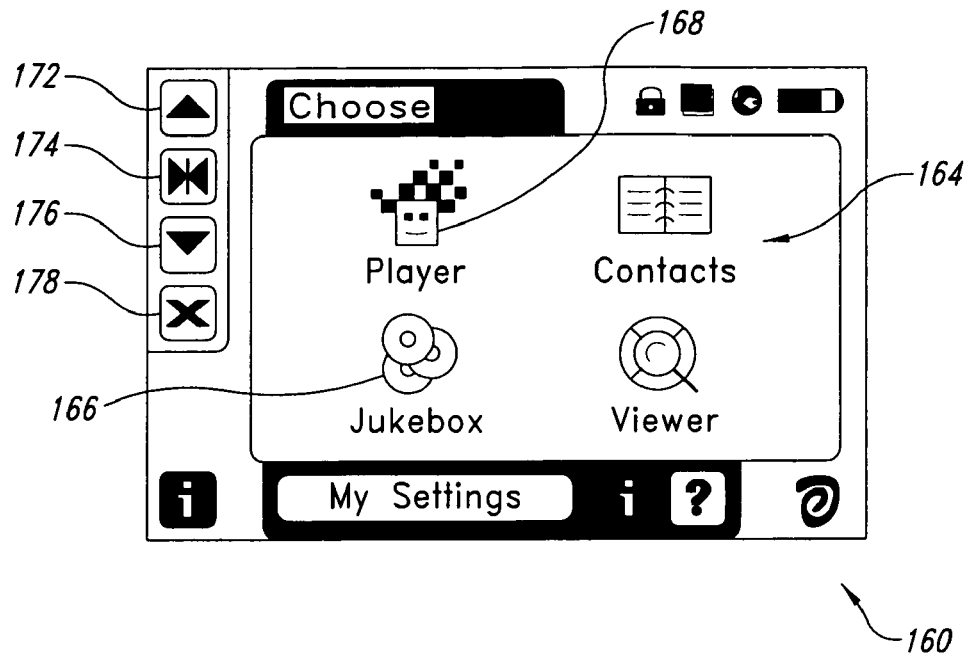
FIGS. 3-8 are various screen displays illustrating the operation of the present invention in various data entry and editing modes.

When power is first applied to the system 100, the display 108 may be configured to illustrate a main menu, such as illustrated in the screen display 160 of FIG. 3. The screen display 160 may include a series of icons 164, such as a jukebox icon 166, a player icon 168, and the like. In addition to icons 164, the screen display 160 may include touch-sensitive programmable controls, such as a "Scroll Up" control button 172, a "Selection" control button 174, a "Scroll Down" control button 176 and an "Exit" control button 178. The operation of a touch-sensitive screen to implement these buttons are well known and need not to be described in any greater detail herein. Furthermore, the operation of the buttons, such as the Scroll Up button 172 and the Scroll Down button 176 are well known in the art and need not be described in detail. Activating the Scroll Up button 172 or the Scroll Down button 176 will cause the display to highlight a different one of the icons 164. When the desired icon is highlighted, such as by reverse video or other conventional technique, the user may activate the selection button 174 to activate the selected function.

Figure 4:
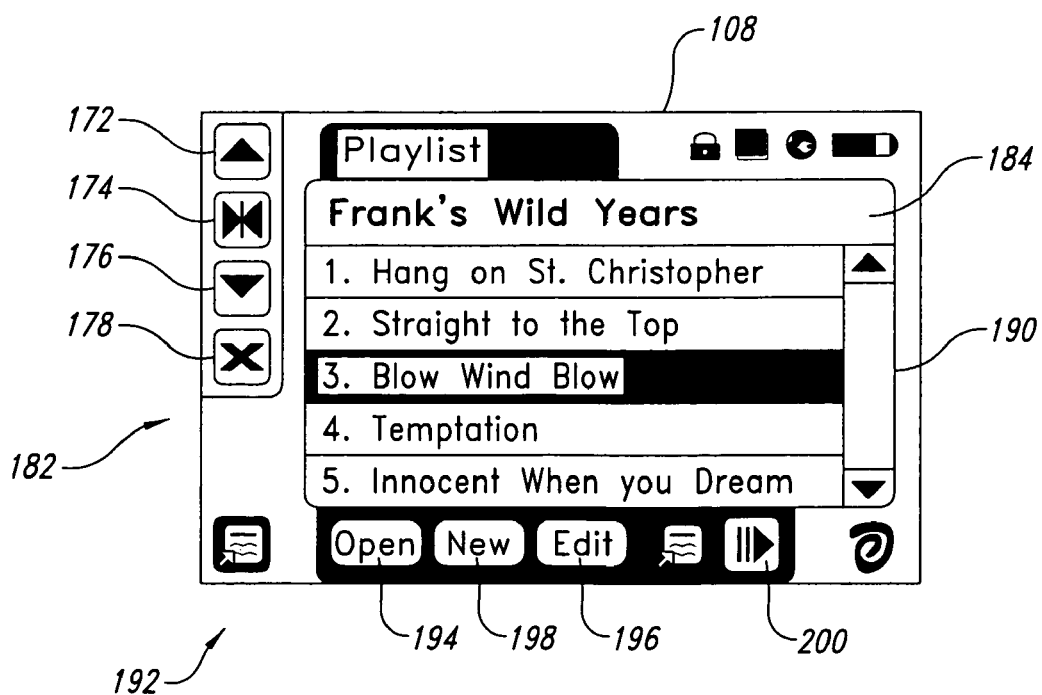

FIG. 4 illustrates a sample screen display 182 shown by the system in response to the activation of the jukebox icon 166 and the selection of one playlist. As previously noted, the system 100 supports a plurality of different playlists. The screen display 182 comprises a playlist title portion for a playlist title display 184 to permit the user to readily identify the selected playlist. The user may simply activate the playlist to play musical tracks in the predetermined sequence shown in the playlist by pressing the Selection control button 174.

When a display list is first shown on the display 108, the first entry in the playlist may be automatically selected and indicated using, by way of example, reverse video. The user may also scroll through the selected playlist using a scroll bar 190 in a well-known fashion or, alternatively, simply by touching the touch-sensitive display 108 at a point corresponding to the desired musical track. The system 100 may also be configured to allow the user to scroll through the selected playlist using the Scroll Up button 172, a Scroll Down button 176, and the Selection control button 174 in the manner described above to select a musical track out of the sequence illustrated in the playlist.

The user may also control the operation of the system 100 to open or edit playlists, or create new playlists using additional programmable control buttons 192 on a predetermined portion of the touch-sensitive display 108. The Programmable control buttons 192 may comprise buttons such as a "Open" control button 194, an "Edit" control button 196 and a "New" control button 198. The Open control button 194 may be used to display a number of different playlists and permit the user to select from one of the displayed playlists in the manner described above. That is, the user may activate the scroll bar 190 or the Scroll Up button 172, the Scroll Down button 174, and the like, to navigate through the displayed playlists. As the displayed playlists scroll up or down the display 108, a selected display list is shown in a highlighted fashion, such as reverse video. The user opens the selected playlist using the Selection control button 174 or another one of the convenient Programmable control buttons 192. The user may edit a selected playlist by selecting the Edit control button 196.

The user may edit an existing playlist by activating the Edit control button 196. Activation of the Edit control button 196 will cause the system 100 to display the names of already established playlists. The user may manipulate through the lists of playlists using, by way of example, the scroll bar 190 to select the desired playlist. When the desired playlist has been selected, the display 108 will indicate the musical tracks already selected in the playlist, as illustrated in FIG. 4. In an exemplary embodiment, the first musical track in the playlist is highlighted using, by way of example, reverse video. The user selects a particular musical track in the manner described above. The user can edit a selected musical track, to correct misspellings or other information, delete an existing musical track from the current playlist, or add additional musical tracks to the selected playlist using conventional editing techniques. The user exits the edit mode by activating the Exit control button 178.

In addition to editing an existing playlist, the user may elect to create a new playlist by activating the New control button 198. When the user activates the New control button 198, the display 108 may be configured to show all musical tracks currently stored in the memory 104. The user may scroll through the list of musical tracks using conventional controls, such as the scroll bar 190. As the user scrolls through the list of musical tracks, a selected musical track may be highlighted using, by way of example, reverse video. Other conventional techniques, such as bold video, underlined text, an asterisk or other indicator, may also be used to indicate the selected musical track. To enter a selected musical track into the new playlist, the user may activate the Selection control button 174. The user may scroll through the displayed list of stored musical tracks and select other musical tracks in the manner described above to thereby enter them into the playlist. When the playlist is completed, the user may exit the data entry mode by selecting the Exit control button 178. Thus, the system 100 has provided the user with a simple technique for creating music playlists.

Figure 5:
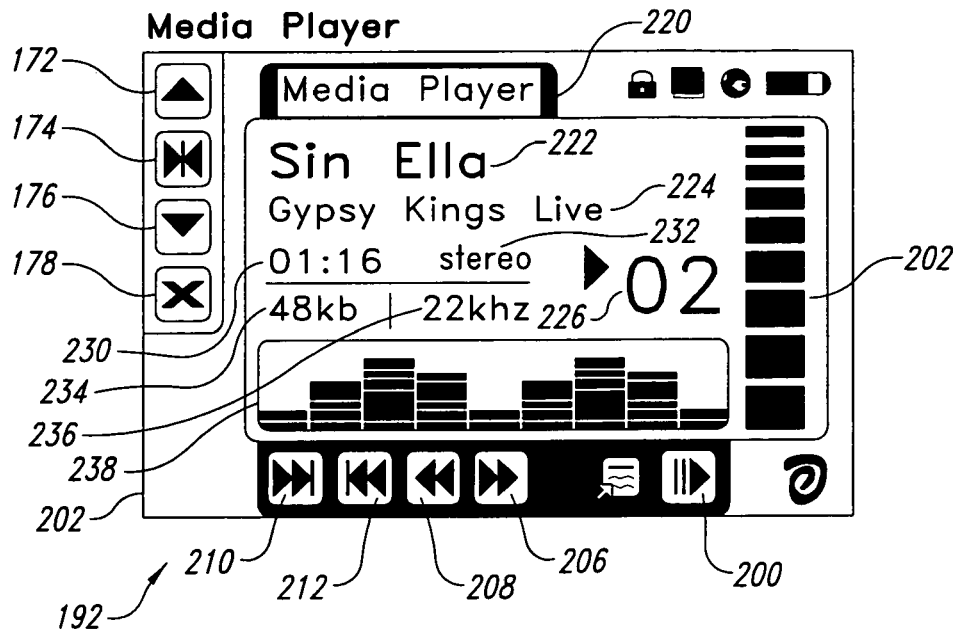

When a playlist or individual musical track has been selected, that selection may be played by activating the Selection control button 174 or a special control button, such as a "Play/Pause" button 200. When a selected musical track begins to play, the touch-sensitive display 108 may be reprogrammed to show a screen display 202, illustrated in FIG. 5. The touch-sensitive display 108 has also been changed such that the control buttons perform different functions relevant to a media player. For example, the Scroll Up control button 172 and Scroll Down control button 174 may now be used to control the volume. A graphical representation 204 may provide visual cues to the user as to the volume level. The programmable control buttons 192 may now comprise a Fast Forward button 206 and Rewind button 208 to advance or rewind within the selected musical track. A Skip Forward button 210 may be used to automatically advance to the next musical track in the playlist while a Skip Rewind button 212 may be activated to rewind to the beginning of the current musical track if activated once and rewound to the beginning of the previous musical track in the playlist if activated twice within a short period of time. In addition, the Play/Pause control button 200 may be used in the manner previously described.

In addition to control buttons, the display screen 202 can provide user information, such as the currently selected function 220, a title 222, an artist name 224, and a track selection 226. Other information, such as an elapsed time 230, stereo indicator 232, sample rate indicator 234, and bandwidth indicator 236 may also be provided on the display screen 202. In addition, an exemplary embodiment of the system 100 may include a graphical equalization display 238 to indicate the relative power of signals at different frequency bands. Those skilled in the art will recognize that numerous variations are possible with the present invention. For example, the graphical equalization display 238 can be eliminated and replaced with other information, such as metatags indicating categories or other identifier tags that correspond to the selected musical track.

Figure 6:
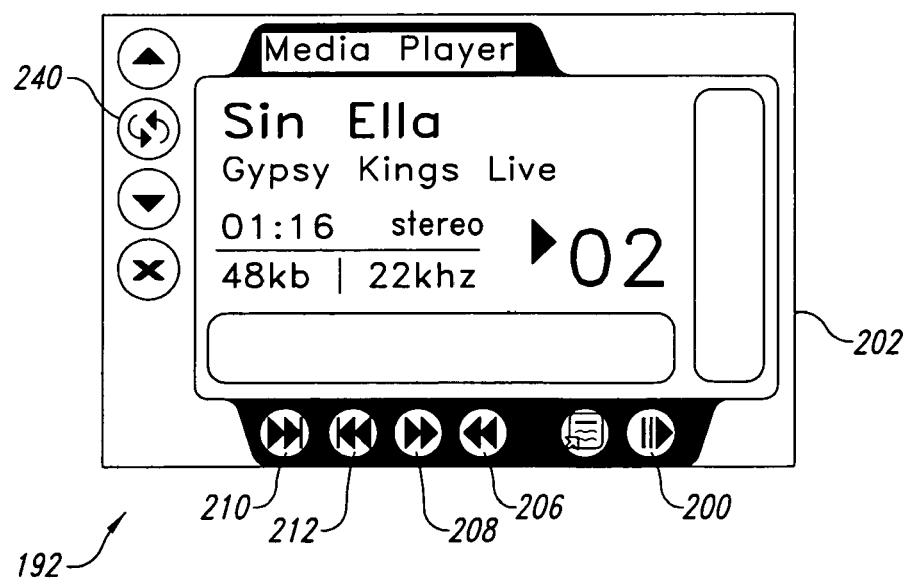

One convenient aspect of on-screen programming using the display 108 is that many configurations are possible. An alternative configuration of the media player is illustrated in FIG. 6 where the programmable controls 192 have a different appearance, but perform the same functions as previously described with respect to FIG. 5. In addition, the Scroll Up control button 172, Scroll Down control button 176 and Exit button 178 have a different appearance in the display screen 202 of FIG. 6, but perform identical functions to those described above with respect to the corresponding buttons in FIG. 5. In FIG. 6, the selection control button 174 has been replaced with a Repeat control button 240 to permit the user to repeat a selected musical track or selected musical playlist. Other programmable features, such as random selection of musical tracks within a playlist, and the like may also be readily provided using the touch-sensitive display 108.

Although the operation of the system 100 has been described with respect to buttons on the touch-sensitive display 108, similar control of the system may be accomplished using, by way of example, the four-button key pad 152 (see FIG. 2) and the two-button key pad 154. Essentially, the buttons of the four-button key pad 152 and two-button key pad 154 are mapped into the functions described above with respect to the Programmable control buttons 192 and the control buttons 172-178. The operation of the four-button key pad 152 and two-button key pad 154 is within the scope of knowledge of one of ordinary skill in the art and thus, need not be described in greater detail herein.

The operation of the system 100 to open, edit, or create playlists has been previously described. In addition to selection of musical tracks by title, the system 100 advantageously allows the selection of musical tracks using metatags. In an exemplary embodiment, the system 100 creates the data structure 134 (see FIG. 1) to store metatags corresponding to musical tracks stored in the memory 104 (see FIG. 1). The data structure or database 134 may be part of the memory 104 (see FIG. 1) or a separate data storage element. Those skilled in the art will recognize that any one of a number of well-known data structures may be satisfactorily used to implement the data structure described herein. For the sake of convenience, the data structure 134 will be subsequently described as a database. However, the present invention is not limited by the specific implementation of a data structure to store metatags.

Figure 7:
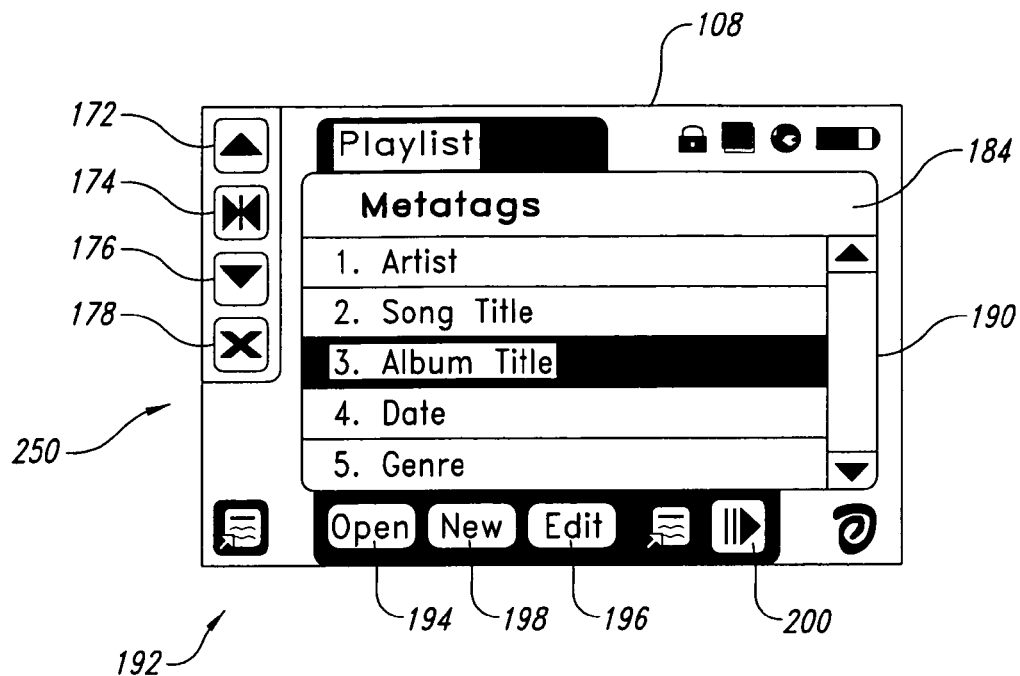

A number of different data elements may be used as metatags. For example, the artist's name, song title, album title, date, copyright, or any other information associated with a musical track can be potentially used as a metatag. In an exemplary implementation, the user may elect to create a new playlist by activating the New control button 198 (see FIG. 4) using metatags to describe the desired musical tracks. In this example, illustrated in FIG. 7, the display 108 shows a screen display 250 that lists a series of possible metatags for selection by the user. In an exemplary embodiment, the first metatag in the list of metatags is automatically selected. The user may scroll through the list using, by way of example, the scroll bar 190 to select a desired metatag, as illustrated in FIG. 7. As noted above, the system 100 can automatically generate a playlist based on the user-selected metatag or provide a list of musical tracks that match the selected metatag for display and subsequent manual selection by the user. For example, if the user selected the metatag "Artist," the system 100 would permit the user to enter the name of a desired artist or, alternatively, will display the artist name for all musical tracks stored in the memory 104 (see FIG. 1). When the user selects a desired artist, the system may automatically generate the playlist and include all songs stored in the memory 104 that have a metatag corresponding to the user-selected artist name. Alternatively, the system 100 can display all musical tracks whose metatag corresponds to the user-selected artist name and thereby permit the user to manually select which musical tracks will be added to the playlist.

Figure 8:
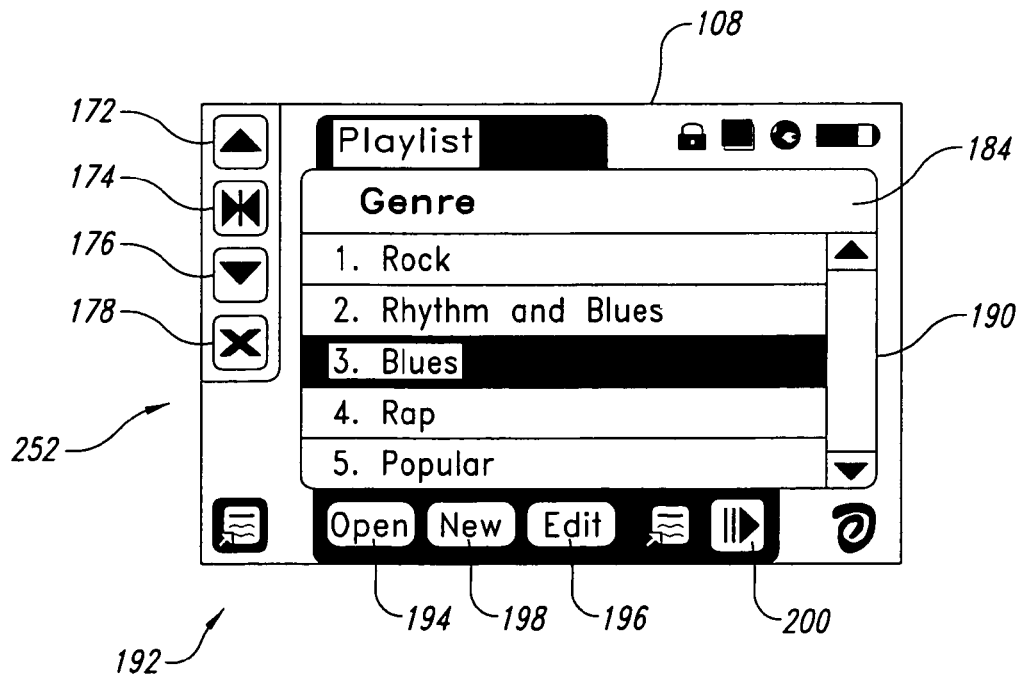

In addition to the metatags discussed above, other metatags, such as musical genre may be used as a metatag. For example, songs may be classified as "Rock," "Blues," "Rap," and the like. If the user selects a particular metatag, the system 100 accesses the database to determine which musical tracks stored in the memory 104 (see FIG. 1) correspond to the selected metatag. If the user selects genre as the desired metatag, the system 100 may generate a screen display 252 on the display 108, as illustrated in FIG. 8, to list the various musical genre for musical tracks stored in the memory 104. As noted above, the first item in the list may be automatically selected and the user may alter the selection using, by way of example, the scroll bar 190. In the example illustrated in FIG. 8, the user-selected musical genre is "Blues." The user may activate the selection using the Selection control button 174. Once a particular genre, such as Blues, has been selected, the system 100 may search the data structure 134 (see FIG. 1) and automatically generate a playlist containing the musical tracks stored in the memory 104 whose metatags match the selected musical genre (i.e., Blues). Alternatively, the system 100 may search the data structure 134 and create a list of all musical titles stored in the memory 104 whose metatag matches the selected musical genre. The list may be shown on the display 108 to permit subsequent manual selection by the user.

It should be noted that each musical track may have a number of different metatags to easily enable the user to search the data structure and automatically generate playlists. The association of musical tracks with multiple metatags makes it easier for the user to search for desired musical tracks. In certain cases, a musical track may appear in more than one category. For example, certain musical tracks may be considered to belong to multiple genre, such as "Rock" and "Popular."

In an alternative embodiment, the system 100 permits searching by multiple metatags. For example, the user may wish to search the data structure 134 for musical tracks that match metatags for both artist name and a particular date. In another example, the user may wish to select a particular musical genre, such as "Rock" and date to automatically generate a musical playlist of rock songs prior to a user-selected date.

Figure 9:
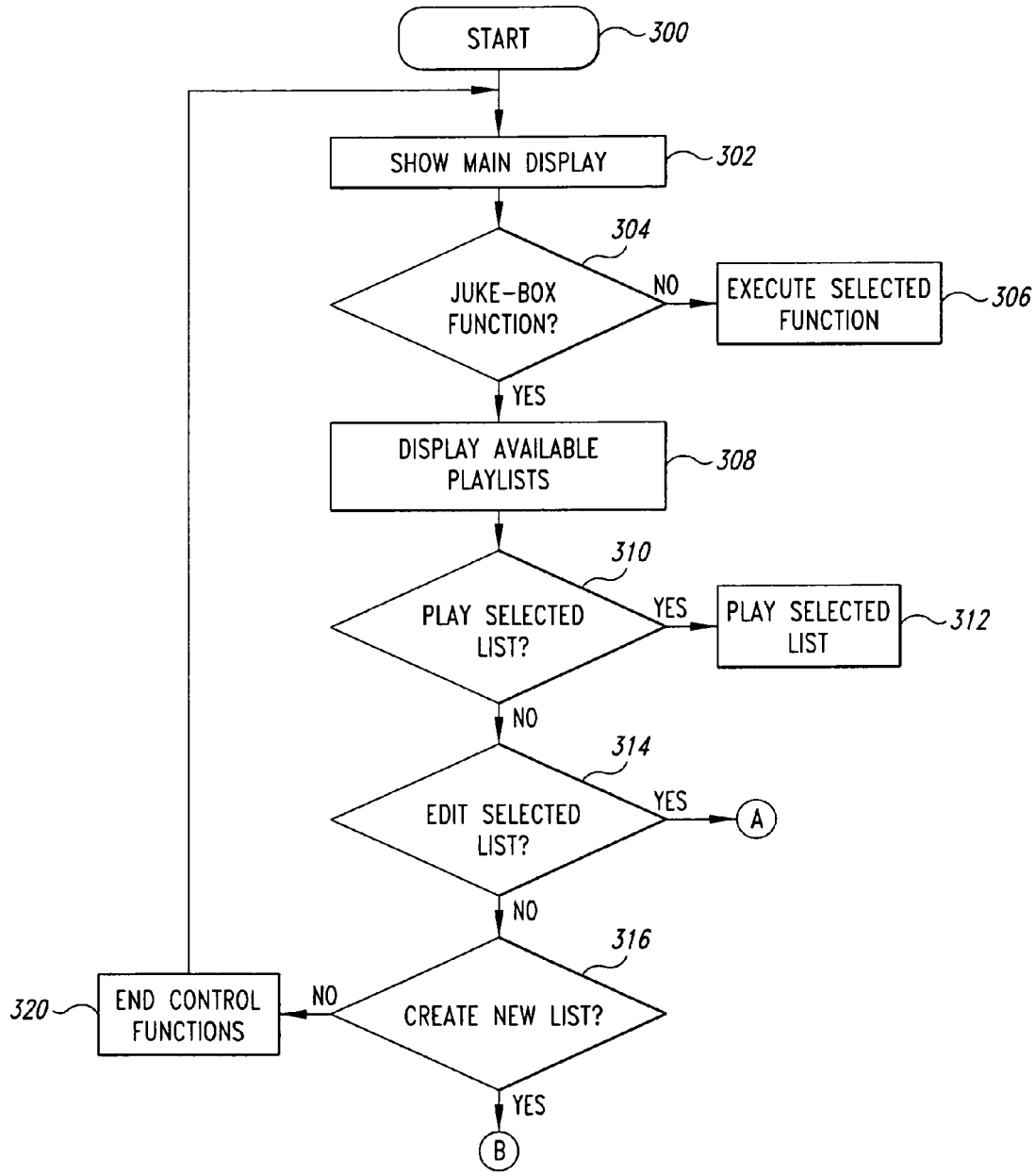
FIGS. 9-11 together form a flow chart illustrating the operation of the system of the present invention.
Figure 10:
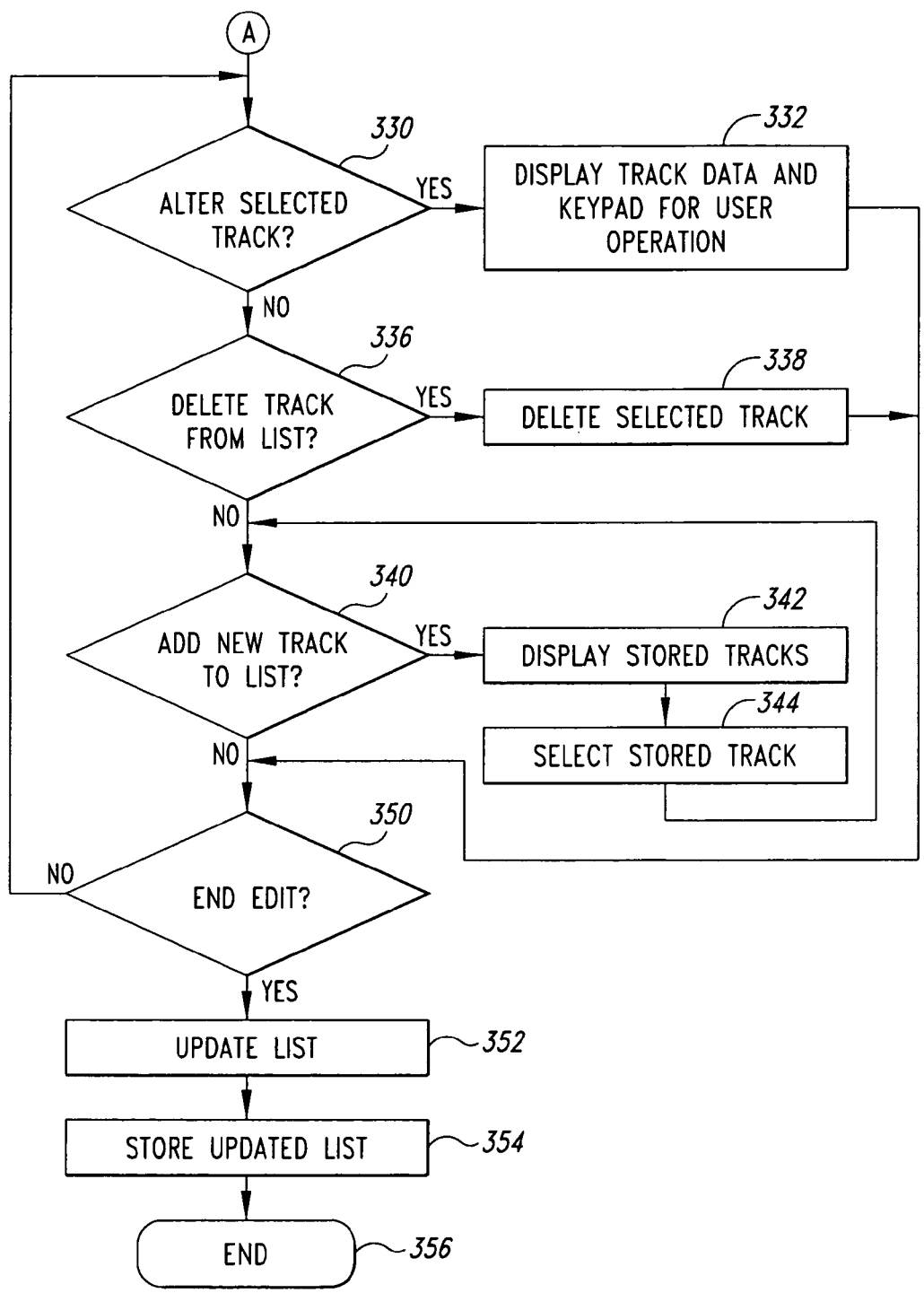
Figure 11:
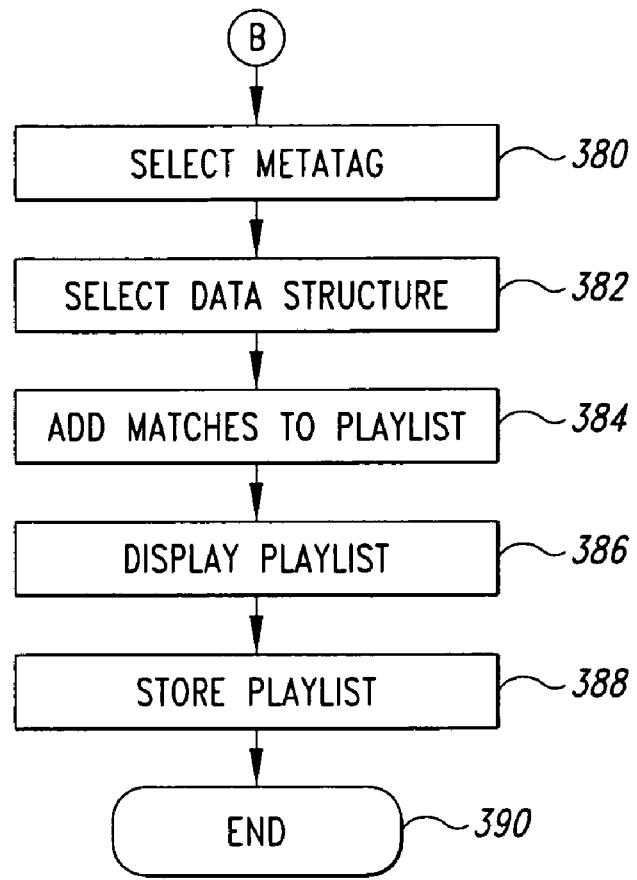

The operation of the invention is illustrated in the flowchart of FIGS. 9-11. At a start 300, illustrated in FIG. 9, it is assumed that the system is under power or has just been turned on by the user. In step 302, the system 100 shows the main display, such as illustrated in FIG. 3. In decision 304, the system determined whether the user has selected the jukebox function. If the user has not selected the jukebox function, the result of decision 304 is NO. In that event, the system moves to step 306 and executes the selected function, such as displaying a contact list of user-entered names, addresses and telephone numbers. These additional functions are beyond the scope of the present invention and will not be discussed in greater detail herein.

If the user has selected the jukebox function, the result of decision 304 is YES. In that event, the system 100 queries the data structure 134 and extracts the titles of all existing playlists and, in step 308, the existing playlists are shown on the display 108 (see FIG. 1). In decision 310, the system 100 determines whether the user has activated one or more buttons to select a playlist. If the user has selected a playlist for play, the result of decision 310 is YES and, in step 312, the system plays the selected playlist by transferring data from the buffer 124 (or the memory 104) to the CODEC 114 in a conventional fashion. As previously noted, the musical tracks of the selected playlist may be played sequentially in the sequence originally specified by the user when creating the playlist, in a new sequence specified by the user at the present time, or in some other fashion, such as random selection.

If the user has not selected a playlist to play, the result of decision 310 is NO. In that event, in decision 314, the system 100 determines whether the user has selected a playlist for editing. If the user has selected a playlist for editing, the result of decision 314 is YES and the system enters an edit mode, described in the flowchart of FIG. 10. If the user has not selected a playlist for editing, the result of decision 314 is NO. In that event, the system determines, in decision 316, whether the user has activated one or more buttons to create a new playlist. If the user has activated one or more buttons on the system 100 to create a new playlist, the result of decision 316 is YES and, the system enters a data entry mode illustrated in FIG. 11. If the user has not elected to create a new playlist, the result of decision 316 is NO and, in step 320, the system ends the control function operation and, in one example, may return to display the main menu in step 302. Those skilled in the art will recognize that a number of different possible flowcharts may be implemented by the present system. For example, the system 100 may return to decision 310 until the user selects an operation. In addition, the activation of other buttons, such as a main menu button (not shown) may be used to exit the control function process and return to the main display in step 302. The flowchart of FIGS. 9-11 are intended simply as an illustration of possible control flow to create, edit, and play selected playlists. The present invention is not limited to the specific processing sequence illustrated in the flowcharts of FIGS. 9-11.

As previously stated, the user may activate one or more of the buttons on the system 100 to edit a selected playlist. If the user has elected to edit a selected playlist, the result of decision 314 in FIG. 9 is YES. In that event, the system 100 moves to decision 330, illustrated in FIG. 10, to determine whether the user has elected to alter a selected track. If the user has elected to alter a selected track, the result of decision 330 is YES. In step 332, the system displays stored data about the selected track and may further display a keypad (not shown) for user operation to change selected data. For example, the user may wish to edit the title of a musical track to correct a typographical error from a previous entry. The user can highlight the selected data element (e.g., the title) and activate the edit control button 196 (see FIG. 4). The user can operate the touch-sensitive display 108 to enter a new title. The altered data will be displayed and stored in subsequent steps described below.

If the user has not elected to alter a selected track, the result of decision 330 is NO. In that event, the system 100 moves to decision 336 to determine whether the user has activated one or more keys to delete a selected track from the playlist. If the user has elected to delete a track from the playlist, the result of decision 336 is YES. In that event, in step 338, the system 100 deletes the selected track and the newly edited playlist is updated and stored in steps described below. The system 100 also checks to see if the user wishes to perform more edits, as will be described in greater detail below. If the user has not activated one or more buttons on the system 100 to delete a musical track from the playlist, the result of decision 336 is NO.

In decision 340, the system 100 determines whether the user has activated one or more buttons on the system 100 to add a new musical track to an existing playlist. If the user has elected to add a new musical track to the playlist, the result of decision 340 is YES. In that event, in step 342, the system 100 displays a list of all musical tracks that may be stored in the memory 104 (or the optional storage device 126). In step 344, the user selects the desired musical track to the selected playlist in the manner described above. In an exemplary embodiment, a musical track that may be stored on the optional storage device 126 may be relocated to the memory 104. Following the selection of the stored musical track in step 344, the system 100 returns to decision 340 to determine whether additional new tracks will be added to the selected playlist.

If no additional musical tracks are to be added to the existing playlist, the result of decision 340 is NO and the edit operation. Following the completion of the selected edit operation, such as altering the selected track in step 332, deleting a selected track in step 338, or adding selected tracks in steps 342-344, the system 100 moves to decision 350 to determine if the user wishes to perform additional edit operations on the selected existing playlist. If the user does not wish to end the current editing session, the result of decision 350 is NO and the system may return to decision 330 to permit additional editing of one or more tracks in the existing playlist.

If the user wishes to end the editing session by activating, by way of example, the Exit control button 178 (see FIG. 4), the result of decision 350 is YES. In that event, in step 352, the system 100 updates the existing playlist to include all edits performed by the user and, in step 354, the system stores the newly edited playlist. As previously discussed, the edited playlists may be conveniently stored as part of the data structure 134. The edit operation ends at 356.

Returning momentarily to the flow chart of FIG. 9, if the user wishes to create a new playlist, the result of decision 316 is YES. In that event, the system executes processes illustrated in the flowchart of FIG. 11 to create a new playlist. As previously discussed, the system 100 may simply display the titles of all musical tracks stored in the memory 104 and allow the user to manually select ones of the displayed musical tracks to add to the newly created playlist. FIG. 11 illustrates the operation of the system 100 to generate a playlist using metatags. In step 380, the user selects a desired metatag from the list shown, by way of example, in the screen display 250, illustrated in FIG. 7. The user may select a metatag, such as genre, which causes the system 100 to display the display screen 252 listing the various genre metatags corresponding to the various musical tracks stored in the memory 104 (or in the storage device 126). In addition, as noted above, the user may select more than one metatag to further refine the selection of musical tracks. Thus, step 380 may represent multi-step processes in which one or more screen displays are provided to the user to guide the user through the metatag selection process.

After one or more metatags have been selected in step 380, the system 100 searches the data structure 134 (see FIG. 1) in step 382. In one example implementation, the data structure 134 may be a conventional database in which search terms, such as the selected metatags, are provided as inputs to the database and results are produced by the database in the form of one or more musical tracks whose metatags correspond to the user-selected metatags.

In step 384, the system automatically adds to the playlist musical tracks whose metatags match the user-selected metatags. The automatically selected playlist is displayed for the user in step 386. The user may manually edit one or more of the musical tracks on the newly generated playlist in the manner described above with respect to the flowchart of FIG. 10. Alternatively, the system 100 may simply display the resultant matches and permit the user to manually select which musical tracks will be added to the newly created playlist. In step 388, the completed playlist is stored in the memory 104 or, alternatively, in the data structure 134. The process ends at 390.

Thus, the system 100 provides a powerful but simple interface that allows the user to quickly generate playlists from stored musical tracks using one or more user-selected metatags. The system further provides simple editing processes that allow the user to readily alter existing playlists.

From the foregoing it will be appreciated that, although specific embodiments of the invention have been described herein for purposes of illustration, various modifications may be made without deviating from the spirit and scope of the invention. For example, the operation of the system 100 has been described using the example of musical tracks as the audio data files that are selected by a user and placed in playlists. However, the system 100 is applicable to any type of audio data file, such as audio books, as well as musical data files. Accordingly, the invention is not limited except as by the appended claims.

What is claimed is:

1. A system for the display and control of music selection in a hand-held portable multi-media device, the system comprising: a housing sized to be held by a user; a circuit board within the housing; a battery power supply to provide electrical power to electrical circuitry on the circuit board; a data structure to store a plurality of music data files, each music selection data file having identification data associated therewith; a display to display data comprising a playlist indicating music data files to be played; an input device operable by the user to select identification data associated with desired music data files for the playlist; a processor responsive to the input device to select the music data files for the playlist based on the user selected identification data; a CODEC to receive the selected music data files and convert the selected music data files to audio data; an audio output driver coupled to the CODEC to receive the audio data therefrom, the audio output driver further having an output and providing analog signals to the output for connection to an audio output device; and an associated data structure wherein the associated data comprises a plurality of data types, the processor analyzing the music data file to determine one or more associated data types and storing each of the data types for each music data file in the associated data structure in association with the music data file; wherein the processor selects the music data files for the playlist by generating an indicator to indicate a storage location in the associated data structure for an associated data type for each of the selected music data files.

* * * * *